(12) United States Patent
Bookbinder et al.

(10) Patent No.: US 8,666,214 B2
(45) Date of Patent: Mar. 4, 2014

(54) LOW BEND LOSS OPTICAL FIBER

(71) Applicants: Dana Craig Bookbinder, Corning, NY (US); Ming-Jun Li, Horseheads, NY (US); Pushkar Tandon, Painted Post, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/680,676

(22) Filed: Nov. 19, 2012

(65) Prior Publication Data

US 2013/0136408 A1    May 30, 2013

Related U.S. Application Data

(63) Continuation-in-part of application No. 13/485,028, filed on May 31, 2012, now Pat. No. 8,588,569.

(60) Provisional application No. 61/564,902, filed on Nov. 30, 2011.

(51) Int. Cl.
| | |
|---|---|
| *G02B 6/02* | (2006.01) |
| *G02B 6/028* | (2006.01) |
| *G02B 6/032* | (2006.01) |
| *G02B 6/10* | (2006.01) |

(52) U.S. Cl.
USPC ............................................ 385/124; 385/126

(58) Field of Classification Search
USPC .................................................. 385/123–128
See application file for complete search history.

(56) References Cited

U.S. PATENT DOCUMENTS

| | | | |
|---|---|---|---|
| 5,559,921 | A | 9/1996 | Terasawa et al. |
| 7,450,807 | B2 | 11/2008 | Bickham et al. |
| 7,565,820 | B2 | 7/2009 | Foster et al. |
| 7,620,282 | B2 | 11/2009 | Bickham et al. |
| 7,676,129 | B1 | 3/2010 | Bookbinder et al. |
| 7,899,293 | B2 | 3/2011 | de Montmorillon et al. |
| 7,903,917 | B2 | 3/2011 | Bickham et al. |
| 7,929,818 | B1 | 4/2011 | Bickham et al. |
| 7,995,889 | B2 | 8/2011 | de Montmorillon et al. |
| 2011/0058780 | A1 | 3/2011 | Han et al. |

OTHER PUBLICATIONS

PCT/US2012/066952 Search Report.

*Primary Examiner* — Ryan Lepisto
*Assistant Examiner* — Erin Chiem
(74) *Attorney, Agent, or Firm* — Svetlana Short

(57) ABSTRACT

One embodiment of a single mode optical fiber includes:
a graded index central core region having outer radius $r_1$ and relative refractive index $\Delta_1$;
a cladding region comprising (i) a first inner cladding region having an outer radius $r_2<10$ microns and relative refractive index $\Delta_2$ and $0.65 \leq r_1/r_2 \leq 1$; (ii) and a second inner cladding region (i.e., trench) having an outer radius $r_3>10$ microns and comprising a minimum relative refractive index $\Delta_3$, wherein said second inner cladding region has at least one region with a relative refractive index delta that becomes more negative with increasing radius; and (iii) an outer cladding region surrounding the second inner cladding region and comprising relative refractive index $\Delta_4$, wherein $\Delta_1 > \Delta_2 > \Delta_3$, $\Delta_3 < \Delta_4$.

20 Claims, 6 Drawing Sheets

US 8,666,214 B2

LOW BEND LOSS OPTICAL FIBER

CROSS-REFERENCE TO RELATED APPLICATION

This application is a continuation-in-part of U.S. patent application Ser. No. 13/485,028 filed on May 31, 2012 the content of which is relied upon and incorporated by reference in its entirety, and the benefit of priority under 35 U.S.C. §120 is hereby claimed. This application also claims the benefit of priority under 35 U.S.C. §119 of U.S. Provisional Application Ser. No. 61/564,902 filed on Nov. 30, 2011 the content of which is relied upon and incorporated herein by reference in its entirety.

FIELD

The present invention relates to optical fibers having low bend losses.

TECHNICAL BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications or optical components that utilize optical fiber can impose physical demands, such as tight bend radii, compression of optical fiber, etc., that induce bend losses. These applications and/or components include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some single mode optical fiber designs to achieve low bend loss at 1550 nm at both small and large bend diameters.

SUMMARY

According to some embodiments a single mode optical fiber includes:

a graded index central core region having outer radius $r_1$, having a relative refractive index $\Delta_1$, a maximum relative refractive index $\Delta_{1max}$ and having an alpha profile, $alpha_{core}$, of $0.5 \leq alpha_{core} \leq 4$;

a cladding region including (a) a trench region surrounding said graded index central core region and comprising a relative refractive index delta $\Delta_3$ that becomes more negative with increasing radius, said trench region having an inner radius $r_2$, an outer radius $r_3 > 10$ microns, and a minimum relative refractive index $\Delta_{3min}$ such that $\Delta_{1max} > \Delta_{3min}$, $r_3 \geq r_{3a}$, and $0.5 \leq (r_{3a}-r_2)/(r_3-r_2) \leq 1$, where $r_{3a}$ is a distance from fiber centerline where $\Delta_3$ first reaches the value $\Delta_{3min}$, said trench region having an alpha profile, $alpha_t$ such that $0.5 \leq alpha_t \leq 5$, and (b) an outer cladding region surrounding said trench region and having a relative refractive index $\Delta_4$, and $\Delta_{3min} < \Delta_4$.

In at least some embodiments the single mode optical fiber further comprises a first inner cladding region situated between the graded index central core region and the trench region (i.e. between graded index central core region and the second inner cladding region that has a relative refractive index delta that becomes more negative with the increasing radius).

According to some embodiments a single mode optical fiber includes:

a graded index germania doped central core region having outer radius $r_1$, having a relative refractive index $\Delta_1$, a maximum relative refractive index $\Delta_{1max}$ and having an alpha profile, $alpha_{core}$, of $0.5 \leq alpha_{core} \leq 4$;

a cladding region comprising (i) a first inner cladding region having an outer radius $r_2 \leq 10$ microns and relative refractive index $\Delta_2$ and $0.65 \leq r_1/r_2 < 1$; (ii) and a second inner cladding region having an outer radius $r_3 > 10$ microns and comprising a relative refractive index $\Delta_3$ and a minimum relative refractive index $\Delta_{3min}$, wherein said second inner cladding region has a relative refractive index delta that becomes more negative with increasing radius, wherein the second inner cladding region has an alpha profile, $alpha_t$, of $0.5 \leq alpha_t \leq 5$; (iii) an outer cladding region surrounding the second inner cladding region and comprising relative refractive index $\Delta_4$, wherein $\Delta_{1max} > \Delta_2 > \Delta_{3min}$, and $\Delta_{3min} < \Delta_4$; and wherein $0.5 \leq (r_{3a}-r_2)/(r_3-r_2) \leq 1$.

According to some embodiments disclosed herein an optical fiber comprises a graded central core region having outer radius $r_1$ and a maximum relative refractive index delta $\Delta_{1max}$, a cladding comprising a first inner cladding region having an outer radius $r_2$ such that $r_1 \leq r_2 < 8$ microns and a relative refractive index delta $\Delta_2$, a second inner cladding region having a relative refractive index delta $\Delta_3$ and a minimum relative refractive index delta $\Delta_{3min}$, wherein $\Delta_1 > \Delta_2 > \Delta_{3min}$, such that the difference between $\Delta_2$ and $\Delta_{3min}$ is greater than 0.08%, and an outer cladding region surrounding the two inner cladding regions. The fibers embodiments disclosed herein preferably exhibit a 22 m cable cutoff less than or equal to 1260 nm, a mode field diameter (MFD) at 1310 nm between 8.2 and 9.6 microns and a zero wavelength dispersion wavelength between 1300 and 1324 nm. In at least some fibers embodiments $r_1/r_2$ is greater than or equal to 0.6, more preferably greater than 0.65, and less than or equal to 1. In at least some fibers embodiments $r_1/r_2$ is greater than or equal to 0.75, more preferably greater than 0.8 and less than or equal to 1.

According to some other embodiments a single mode optical fiber includes:

a graded index germania doped central core region having outer radius $r_1$, peak (maximum) relative refractive index delta in the central core region of $\Delta_{1max}$; and the core region having a graded index alpha profile with $alpha_{core}$ between 1 and 3;

a cladding region comprising (i) a first inner cladding region having an outer radius 4.5 microns$<r_2<9$ microns and relative refractive index $\Delta_2$ and $0.65 \leq r_1/r_2 \leq 1$; (ii) and a second inner cladding region having an outer radius $r_3 > 10$ microns and comprising a minimum relative refractive index delta $\Delta_{3min}$, wherein said second inner cladding region has at least one region with a relative refractive index delta that becomes more negative with increasing radius wherein said second inner cladding region has an alpha profile, $alpha_t$, of $0.5 \leq alpha_t \leq 5$; and (iii) an outer cladding region surrounding the inner cladding region and comprising relative refractive index $\Delta_4$, wherein $\Delta_1 > \Delta_2 > \Delta_{3min}$, $\Delta_{3min} < \Delta_4$.

Also disclosed herein are optical fiber embodiments comprising a central core region having outer radius $r_1$ and a maximum relative refractive index delta $\Delta_{1max}$, a cladding region comprising a first inner cladding region having an outer radius $r_2 < 8$ microns and a relative refractive index delta $\Delta_2$, and a second inner cladding region surrounding the first inner cladding region and having relative refractive index $\Delta_3$, wherein $\Delta_{1max} > \Delta_2 > \Delta_{3min}$, and $\Delta_2 - \Delta_{3\ min}$ is $\geq 0.1$. The fibers disclosed herein preferably exhibit a 22 m cable cutoff less than or equal to 1260 nm, mode field diameter (MFD) at 1310 nm between 8.2 and 9.6 microns and zero wavelength dispersion between 1300 and 1324 nm. In these fibers some embodiments $r_1/r_2$ is greater than or equal to 0.6, more preferably between 0.8 and 1. Preferably, $|\Delta_4 - \Delta_2| \geq 0.01$.

Applicants have discovered that having a fiber with a trench that has a non-constant relative refractive index delta helps in achieving good macrobending performance at both small (<10 mm) and large (>20 mm) diameters. The following single mode fiber embodiments have a trench with a non-constant relative refractive index delta that decreases with an increasing radius in at least a region thereof, resulting in low macrobend loss and opticals (optical performance parameters) that are ITU-G.652 standards compliant. In at least some embodiments the index in the second inner cladding region decreases with increasing radial position.

In at least some embodiments $\alpha_t \leq 5$, where $\alpha_t$ (i.e., alpha$_t$) is a trench alpha parameter. For some embodiments $0.5 \leq \alpha_t \leq 5$.

Reference will now be made in detail to the present preferred embodiments, examples of which are illustrated in the accompanying drawings.

DETAILED DESCRIPTION OF THE PREFERRED EMBODIMENT

Figure 1:
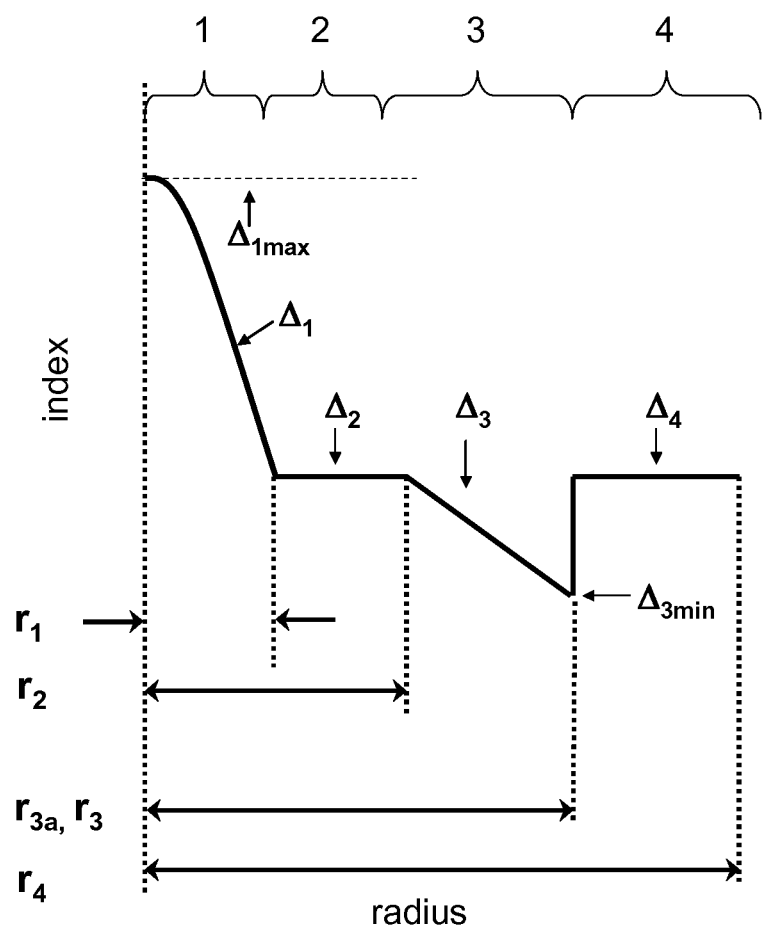
FIGS. 1-6 show schematic relative refractive index profiles corresponding to several embodiments of an optical fiber as disclosed herein.

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and optical fiber radius. The radius for each segment of the refractive index profile is given by the abbreviations $r_1, r_2, r_3, r_4$, etc. and lower an upper case are used interchangeability herein (e.g., $r_1$ is equivalent to $R_1$).

The "relative refractive index percent" is defined as $\Delta\% = 100 \times (n_i^2 - n_c^2)/2n_i^2$, and as used herein $n_c$ is the refractive index of the outer cladding region and unless otherwise specified is the refractive index of pure silica As used herein, the relative refractive index is represented by $\Delta$ and its values are given in units of "%", unless otherwise specified. The terms: relative refractive index delta, delta, $\Delta$, $\Delta\%$, $\%\Delta$, delta %, % delta and percent delta may be used interchangeability herein. In cases where the refractive index of a region is less than the average refractive index of the outer cladding, the relative index percent is negative and is referred to as having a depressed region or depressed index. In cases where the refractive index of a region is greater than the average refractive index of the outer cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine, boron and non-periodic voids. The terms alpha$_{core}$, alpha$_c$ and $\alpha$(core) refer to the core alpha and are used interchangeably herein.

For a person skilled in the art, it will be obvious that the relative index profiles disclosed herein can be modified such that entire index profile is shifted linearly up or down relative to the index of pure silica and result in similar optical properties of the resulting optical fibers.

"Chromatic dispersion", herein referred to as "dispersion" unless otherwise noted, of an optical fiber is the sum of the material dispersion, and the waveguide dispersion. Zero dispersion wavelength is a wavelength at which the dispersion has a value of zero. Dispersion slope is the rate of change of dispersion with respect to wavelength.

"Effective area" is defined in equation 1 as:

$$A_{\mathit{eff}} = 2\pi (\int f^2 r\, dr)^2 / (\int f^4 r\, dr) \qquad \text{(Eq. 1)}$$

where the integration limits are 0 to $\infty$, and f is the transverse component of the electric field associated with light propagated in the waveguide. As used herein, "effective area" or "$A_{\mathit{eff}}$" refers to optical effective area of the optical fiber, at a wavelength of 1550 nm unless otherwise noted.

The term "$\alpha$-profile" refers to a relative refractive index profile of the region, expressed in terms of $\Delta(r)$ which is in units of "%", where r is radius, which for the core alpha follows the equation 2, $$\Delta(r) = \Delta(r_o)(1 - [|r - r_o|/(r_1 - r_o)]^{\alpha(core)}) \qquad \text{(Eq. 2)}$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method as shown in equations 3 and 4, respectively wherein, $$2w = \text{MFD} \qquad \text{(Eq. 3)}$$

and $$w^2 = (2\int f^2 r\, dr / \int [df/dr]^2 r\, dr) \qquad \text{(Eq. 4)}$$

wherein the integral limits being 0 to $\infty$.

The bend resistance of an optical fiber can be gauged by induced attenuation under prescribed test conditions, for example by deploying or wrapping the fiber around a mandrel of a prescribed diameter, e.g., by wrapping 1 turn around a either a 6 mm, 10 mm, 20 mm, 30 mm or similar diameter mandrel (e.g. "1×10 mm diameter macrobend loss" or the "1×30 mm diameter macrobend loss") and measuring the increase in attenuation per turn.

One type of bend test is the lateral load microbend test. In this so-called "lateral load wire mesh" test (LLWM), a prescribed length of optical fiber is placed between two flat plates. A #70 wire mesh is attached to one of the plates. A known length of optical fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the optical fiber in dB/m at a specified wavelength (typically within the range of 1200-1700 nm, e.g., 1310 nm or 1550 nm or 1625 nm).

The "pin array" bend test is used to compare relative resistance of optical fiber to bending. To perform this test, attenuation loss is measured for an optical fiber with essentially no induced bending loss. The optical fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm During testing, sufficient tension is applied to make the optical fiber conform to a portion of the pin surface. The increase in attenuation is the pin array attenuation in dB of the optical fiber at a specified wavelength (typically with in the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

Applicants discovered that putting an off-set trench with a non-constant depth in the profile of a single mode fiber can simultaneously improve bend performance at both small ($\leq 10$ mm) and large ($\geq 20$ mm) bend diameters. The following fiber embodiments result in low bend performance at small and large bend diameters and have other opticals that are G.652 standards compliant (MFD between 8.2 and 9.6 microns at 1310 nm, zero dispersion wavelength between 1300 and 1324 nm, cable cutoff wavelength less than or equal to 1260 nm).

Preferably MFD (at a wavelength of 1310 nm) of the optical fiber 10 is between 8.2 microns and 9.6 microns. For example, 8.2 microns$\leq$MFD$\leq$and 9.6 microns, or 8.5 microns$\leq$MFD$\leq$and 9.4 microns (e.g., 8.6 microns, 8.8 microns, 9 microns, 9.2 microns, 9.4 microns, 9.6 microns, or therebetween).

As shown in FIGS. 1-6, according to some embodiments a single mode optical fiber 10 includes:

a graded index central core region 1 (or core) having outer radius $r_1$, having a relative refractive index $\Delta_1$, a maximum relative refractive index $\Delta_{1max}$ and having an alpha profile, alpha$_{core}$, of 0.5$\leq$alpha$_{core}$$\leq$4; and a cladding region surrounds the core and comprises at least one inner cladding region 2, 3 and an outer cladding region 4. The second inner cladding region 3 (also referred to as a trench, trench region, or moat herein) has an inner radius $r_2$ and an outer radius $r_3$. In some embodiments $r_3$>10 microns. Region 3 also comprises a relative refractive index $\Delta_3$ and a minimum relative refractive index $\Delta_{3min}$, such that its relative refractive index delta becomes more negative with increasing radius. The inner cladding region 3 has an alpha profile, alpha$_t$, and preferably 0.5$\leq$alpha$_t$$\leq$5. The outer cladding region 4 surrounds the inner cladding region and has a relative refractive index $\Delta_4$, wherein $\Delta_{1max}$>$\Delta_2$>$\Delta_{3min}$, and $\Delta_{3min}$<$\Delta_4$. In the optical fiber embodiments of FIGS. 1-6 $r_1 \leq r_2$. In some preferred embodiments 0.65$\leq r_1/r_2 \leq$1.

According to some embodiments optical fiber 10 includes a first inner cladding region 2 with an outer radius $r_2$, and a second inner cladding region 3 with an outer radius $r_3$. For these embodiments $r_1$<$r_2$. In some embodiments, the optical fiber 10 does not include the first inner cladding region 2 (see FIG. 4, for example), for these embodiments $r_2$=$r_1$ and the ratio $r_1/r_2$=1.

Several schematic refractive index profiles of an exemplary fiber 10 are shown in FIGS. 1-6. Optical fibers 10 of FIGS. 1-6 include a central graded index glass core region 1 (or core) comprising maximum relative refractive index delta percent $\Delta_{1max}$. The core region 1 has a graded index profile also referred to as a gradient or graded index profile herein. Optical fibers 10 may have core regions with the alpha$_{core}$ values ($\alpha_{core}$) ranging as 0.5$\leq \alpha_{core} \leq$5, in some embodiments 1$\leq \alpha_{core} \leq$5, in some embodiments 1$\leq \alpha_{core} \leq$4, in some embodiments 1.5$\leq \alpha_{core} \leq$3 in some other embodiments 1.5$\leq \alpha_{core} \leq$2.5. As shown in FIGS. 1-3 and 5-6, in some embodiments of the optical fiber 10 the second inner cladding region 3 is offset from the core region 1, such that the optional first inner cladding region 2 is sandwiched between the central glass core region 1 and the second inner cladding region 3 (in these embodiments $r_2$>$r_1$). The outer cladding region 4 surrounds the second inner cladding region 3 and comprises a relative refractive index delta 44. In these embodiments the first, optional, inner cladding region 2 surrounds and is directly adjacent to the central core region 1, and comprises a relative refractive index delta percent $\Delta_2$. In these embodiments the second inner cladding region 3 surrounds the first inner cladding region 2 and comprises refractive minimum index delta percent $\Delta_{3min}$. In the fiber embodiments that do not include the first inner cladding region 2 (as shown for example in FIG. 4) the second inner cladding region 3 (i.e., the trench region) surrounds and is directly adjacent to the core region 1, the second inner cladding region 3 comprising minimum relative refractive index delta percent $\Delta_{3min}$. In these embodiments, for modeling purposes, we set $r_2$=$r_1$, and $\Delta_2$=$\Delta_{3max}$.

The second inner cladding region 3 does not have a constant $\Delta_3(r)$. Preferably $\Delta_3(r)$ decreases with increasing radius and may have a triangular cross-section. Thus, in some embodiments minimum relative refractive index $\Delta_3$ of this region occurs at r=$r_3$ (i.e., $\Delta_3$(r=$r_3$)=$\Delta_{3min}$). Preferably the second inner cladding region 3 comprises silica doped with fluorine. The outer cladding region 4 surrounds second inner cladding region 3 (i.e., the trench) and comprises relative refractive index delta percent $\Delta_4$ FIG. 1 illustrates a relative refractive index profile $\Delta_3(r)$ of an embodiment of fiber 10 that has a triangular trench profile. This figure shows that the relative refractive index of the second inner cladding region 3 monotonically decreases with increasing radius, and $\Delta_3(r_2)$>$\Delta_3(r_3)$. In the embodiment of FIG. 1 $\Delta_2$=$\Delta_4$. However, $\Delta_2$ does not need to be the same as $\Delta_4$ (e.g., $\Delta_2$ may be larger or smaller than 44. In some embodiments, $\Delta_4 \leq \Delta_2$. In some embodiments, 0.00%$\leq$($\Delta_4$-$\Delta_2$)$\leq$0.1%.

Figure 2:
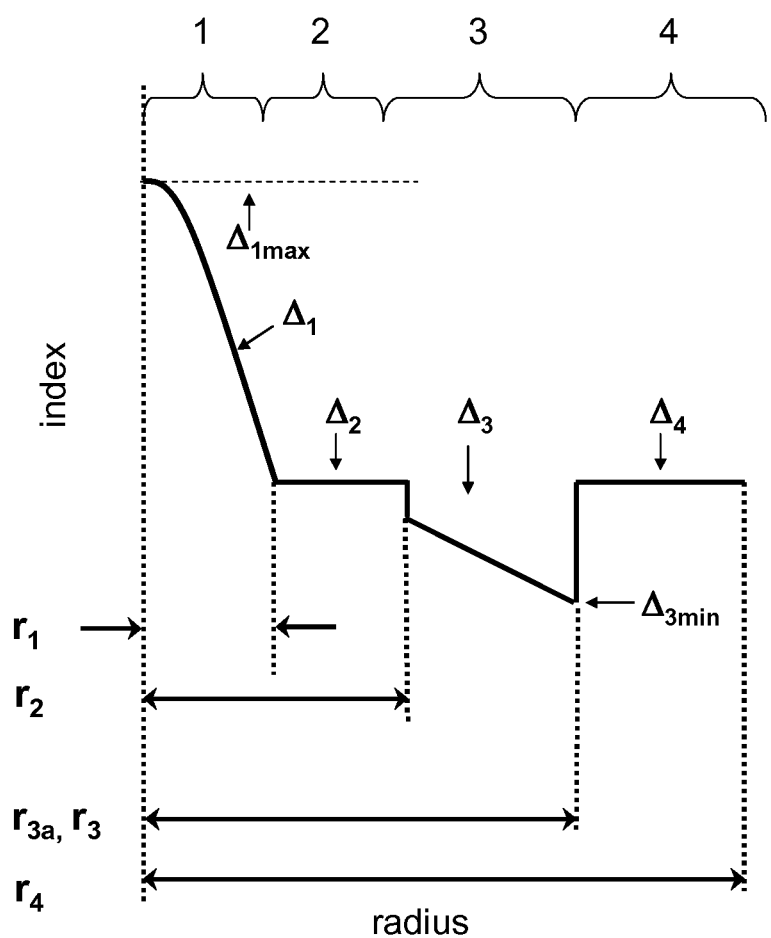

FIG. 2 illustrates a relative refractive index profile of embodiment of fiber 10 that has a trapezoid-shaped trench profile. In this embodiment the relative refractive index of the second inner cladding region 3 also decreases with increasing radius, and $\Delta_3(r_2)$>$\Delta_3(r_3)$. In the embodiment of FIG. 2 $\Delta_2$=$\Delta_4$, but in some embodiments $\Delta_2$ and $\Delta_4$ have different values (e.g., $\Delta_2$>$\Delta_4$, or $\Delta_2$<$\Delta_4$).

Figure 3:
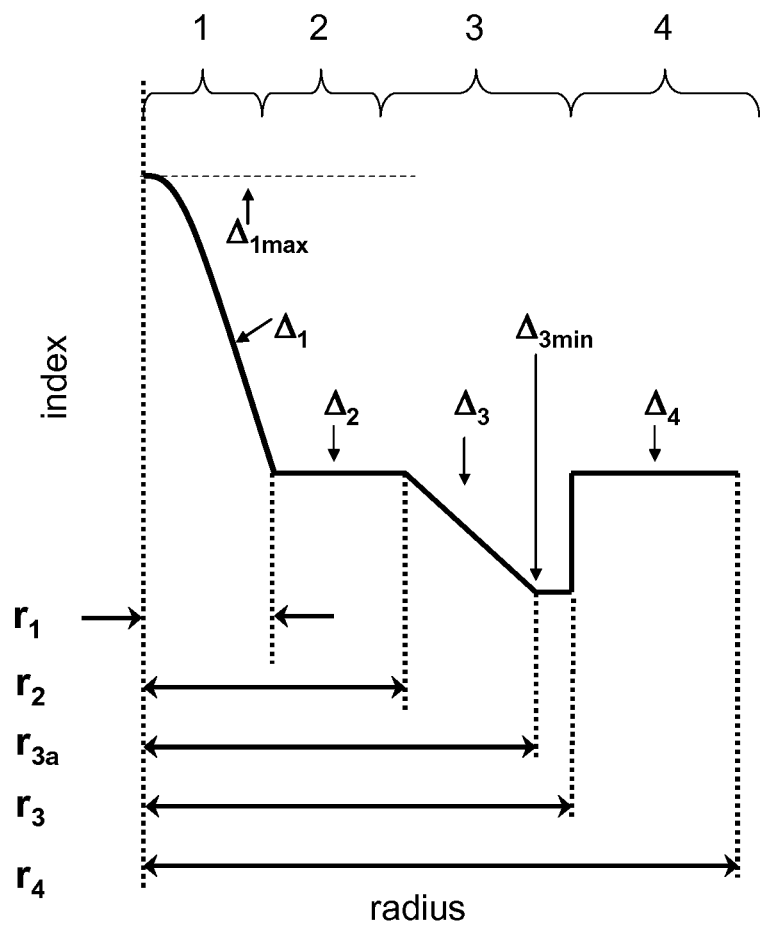

FIG. 3 illustrates a relative refractive index profile of another embodiment of fiber 10. In this embodiment the relative refractive index of the second inner cladding region 3 monotonically decreases with increasing radius until it reaches a value $r=r_{3a}$, and then is constant between the radii $r_{3a}$ and $r_3$. In this embodiment $\Delta_3(r_2) > \Delta_3(r_3)$ and $\Delta_3(r_2) > \Delta r_3$ ($r_{3a}$). As shown in FIG. 3, for example, radius $r_{3a}$ is the radius where the value $\Delta_{3min}$ is first reached, moving radially outward from the centerline. In some embodiments, $r_{3a}=r_3$. (See, for example, FIGS. 1, 2, 4 and 5) In the embodiment shown in FIG. 3 $\Delta_2=\Delta_4$ but in some embodiments $\Delta_2$ and $\Delta_4$ have different values (e.g., $\Delta_2>\Delta_4$, or $\Delta_2<\Delta_4$). In some embodiments $0.1\% \geq |\Delta_2-\Delta_4| \geq 0.01\%$.

Figure 4:
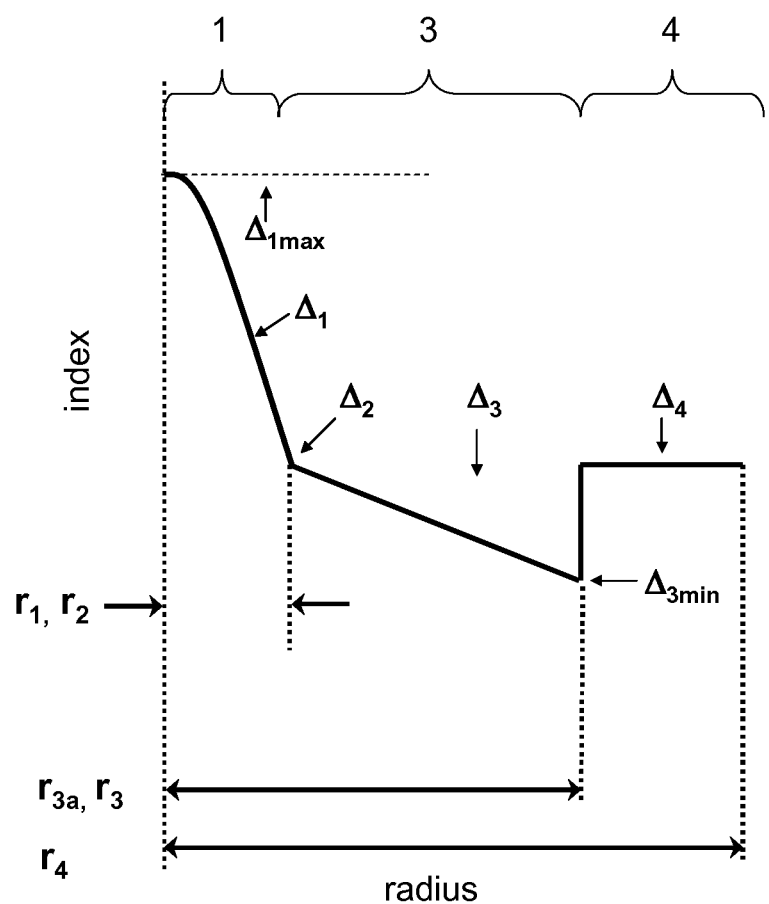

FIG. 4 illustrates relative refractive index profile of an embodiment of fiber 10 that also has a trench profile that is similar to the profile of FIG. 1, but in FIG. 4 the width of the first inner cladding region 2 is zero, i.e., this fiber embodiment does not have the inner cladding region 2. In this embodiment $r_1=r_2$.

Figure 5:
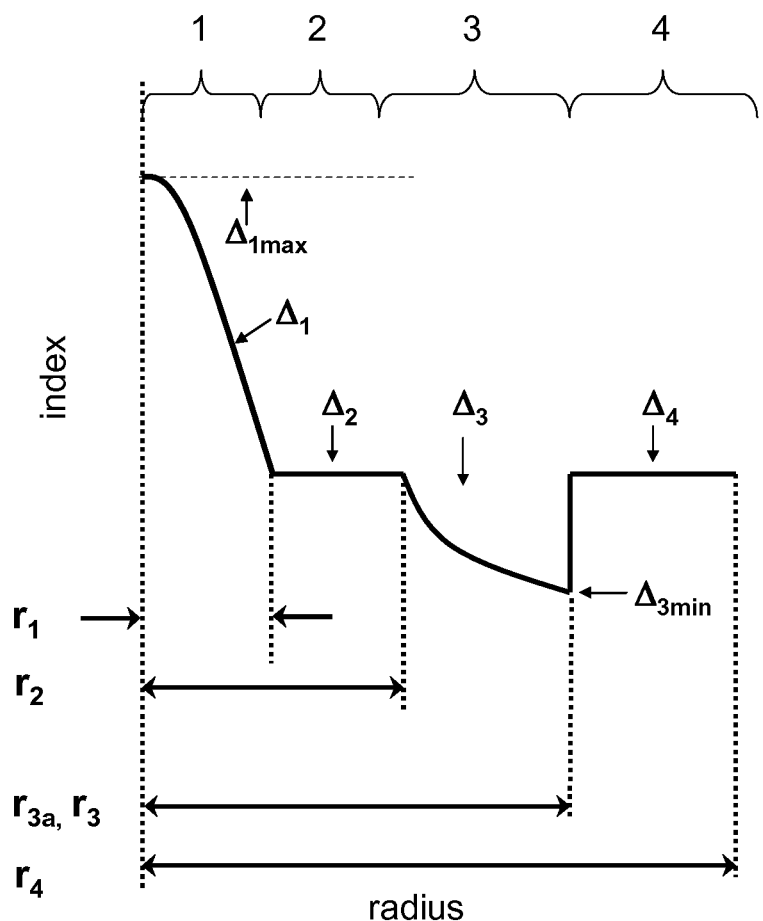

FIG. 5 illustrates relative refractive index profile of an embodiment of fiber 10 that also has a trench profile that is similar to the profile of FIG. 1, but in FIG. 5 the relative refractive index profile of the second inner cladding region 3 has a shape that is concave.

Figure 6:
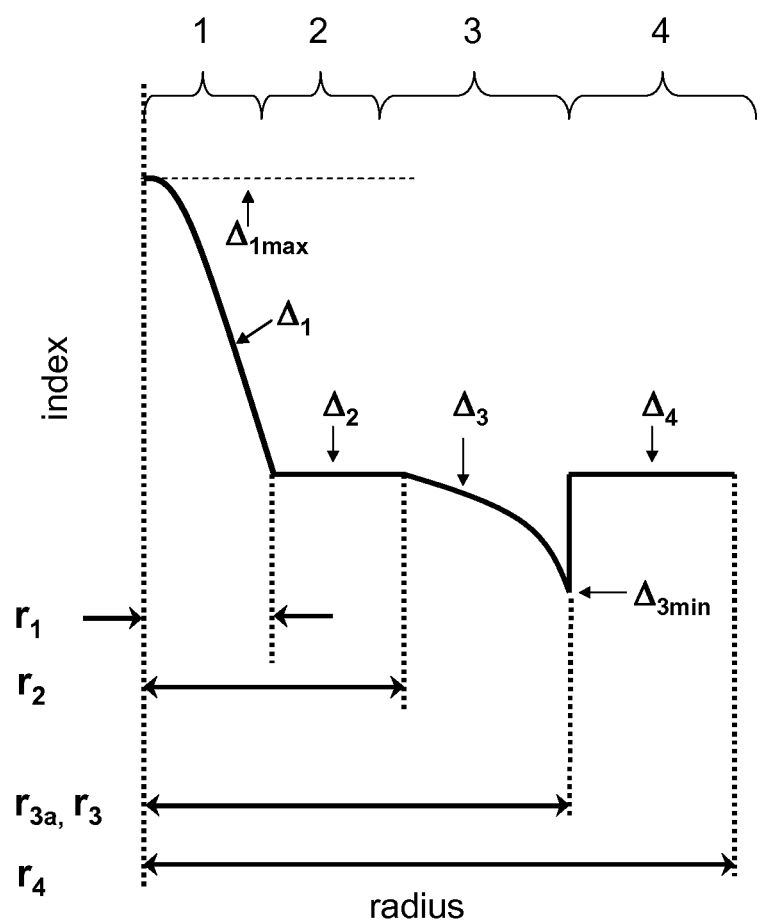

FIG. 6 illustrates relative refractive index profile of an embodiment of fiber 10 that also has a trench profile and that is similar to the profile of FIG. 1, but in FIG. 6 the relative refractive index profile of the second inner cladding region 3 has a convex portion. That is, the relative refractive index of the of the second inner cladding region 3 decreases relatively slowly in a region close to the first inner cladding region 2 and then relatively rapidly as the radius approaches $r_3$ (in a region of the second inner cladding region 3 that is closer to the outer cladding region).

In the exemplary embodiments, $\Delta_{1max} > \Delta_2 > \Delta_{3min}$ and $\Delta_{3min} < \Delta_4$. Preferably $\Delta_2 - \Delta_{3min} \geq 0.08\%$. In some embodiments $0.08\% \leq \Delta_2 - \Delta_{3min} \leq 0.7\%$. In other embodiments $0.08\% \leq \Delta_2 - \Delta_{3min} \leq 0.25\%$. In other embodiments $0.25\% \leq \Delta_2 - \Delta_{3min} \leq 0.55\%$. Additional optional core or cladding regions may be employed. For example (not shown), another region (2A) may be situated between the core and the region 3. The optional inner cladding region 2A may be may be directly adjacent to and surround core region 1 and comprise a higher or a lower relative refractive index delta percent $\Delta_{2A}$ than that of the annular region 2 (i.e., $\Delta_{2A} < \Delta_2$, or $\Delta_{2A} > \Delta_2$). The index of refraction (and thus the relative refractive index delta) of the second inner cladding region 3 (the trench region) preferably decreases with increasing radial position.

Another parameter that can be used to define the trench shape (i.e., the refractive index shape of the second inner cladding region 3, where $r_2 \leq r \leq r_3$) is the parameter, $\alpha_t$ (alpha$_t$), which defines a relative refractive index profile in the second inner cladding region 3, expressed in terms of $\Delta(r)$ which is in units of "%", where r is radius, which follows the equation 5, $$\Delta(r)=(\Delta_{3min}-\Delta(r_2))(1-[|r_3-r|/(r_3-r_2)]^{\alpha_t})+\Delta(r_2) \quad \text{(Eq. 5)}$$

where $\alpha_t$ is the trench alpha parameter (also referred to as alpha$_t$ herein). For a rectangular trench, the value of parameter $\alpha_t$ is greater than 100, while for a triangular trench the value of parameter $\alpha_t$ is 1. Preferably $\alpha_t \leq 10$. In some embodiments of optical fiber 10, the parameter $\alpha_t$ is between 0.5 and 5, more preferably between 0.5 and 3 and even more preferably between 0.75 and 2.

Central core region 1 comprises an outer radius $r_1$ which is defined as the first radial location moving away radially outward from the $\Delta_{1max}$ corresponding to where a tangent line drawn through the maximum absolute slope of the relative refractive index of central core region 1 (that is $r=r_1$ where $|d\Delta(r)/dr|$ is maximum) crosses the zero delta line. Core region 1 (also referred to as a core herein) preferably exhibits a maximum relative refractive index delta percent, $\Delta_{1max}$, between about 0.3 to 0.5, more preferably between about 0.31 to 0.48, for example between about 0.31 to 0.45. In some embodiments, $\Delta_{1max}$ is between 0.31 and 0.43. In some embodiments $\Delta_{1max}$ is less than 0.42. Core radius $r_1$ is preferably between 3 and 9 microns, more preferably between about 3.5 to 8.0 microns, for example $3.5 \leq r_1 \leq 7.0$ microns, or $4.5 \leq r_1 \leq 6.5$ microns. Central core region 1 may comprise a single segment, step index profile. In some embodiments, central core region 1 exhibits an alpha profile with an alpha $\alpha$ value greater than 0.5 and less than 10, and in some embodiments less than 7.5, less than 5, or less than 3. In some preferred embodiments, central core region 1 exhibits an alpha greater than 0.5 and less than 10, and in some embodiments less than 5, or less than 3, and a core region 1 having a relative refractive index delta percent, $\Delta_{1max}$ between 0.30 to 0.48 (e.g., $0.36 \leq \Delta_1 \leq 0.44$).

In the embodiment illustrated in FIG. 1, the inner cladding region 2 surrounds central core region 1 and comprises inner radius $r_1$ and outer radius $r_2$, $r_1$ being defined as above and $r_2$ which is defined as the first radial location moving away radially outward from $r_1$ where the relative refractive index is equal to $0.03(\Delta_{3min})$. In some cases the relative refractive index in region 2 is essentially flat, in other cases there can be a gradient index profile, and in some embodiments region 2 decreases in relative refractive index as radius increases. Still in other cases there can be fluctuations as a result of small profile design or process variations. In some embodiments, the first inner cladding region 2 contains less than 0.02 wt % fluorine. In some embodiments, the inner cladding region 2 comprises silica which is substantially undoped with either fluorine or germania, i.e., such that the region is essentially free of fluorine and germania. In some other embodiments, region 2 is doped with fluorine that is less than 0.2 wt %. According to some embodiments, the inner cladding region 2 exhibits a width between about 0.2 to 6 microns, more preferably 0.5 to 5 microns, even more preferably between about 1 to 4 microns. Preferably, 5 micron $\leq r_2 \leq$ 9 micron, more preferably 6 micron $\leq r_2 \leq$ 8 micron. The ratio of the core radius $r_1$ over the inner cladding region 2 radius $r_2$ is preferably at least 0.75 and less than 1, more preferably greater than 0.8.

Inner cladding region 2 comprises relative refractive index delta percent $\Delta_2$ which, when $r_2$ is not equal to $r_1$, is calculated using equation 6:

$$\Delta_2 = \int_{r1}^{r2} \Delta(r)\,dr/(r_2-r_1) \quad \text{(Eq. 6)}$$

In some embodiments, the first inner cladding region 2 comprises silica which is substantially undoped with either fluorine or germania, i.e., such that the region is essentially free of fluorine and germania. Inner cladding region 3 preferably includes a down-dopant, for example fluorine to provide a minimum relative refractive index delta that is lower than that of region 2. In the embodiments illustrated in FIGS. 1-3 and 5-6, the second inner cladding region 3 surrounds the first inner cladding region 2 and comprises inner radius $r_2$ and outer radius $r_3$, $r_2$ being defined as above and $r_3$ being defined as where the relative refractive index profile curve again crosses the zero delta line ($\Delta_4$) at the first radial location moving away radially outward from the radius $r_2$. (Please note that in the embodiment of FIG. 4, there is no inner cladding, i.e., the inner cladding width is zero ($r_1=r_2$), in this case $\Delta_2=\Delta_3$ max. In some cases the relative refractive index in region 3

(i.e., the relative refractive index of the trench) can have a gradient index profile, in some preferred embodiments the relative refractive index in region 3 has a shallower depression in the inner part of the region and a deeper depression in the outer part of the region. In addition, there can be fluctuations as a result of small profile design or process variations In some embodiments the second inner cladding region 3 includes fluorine and/or boron. Inner cladding region 3 comprises relative refractive index delta percent $\Delta_3$ (r), and the minimum relative refractive index delta $\Delta_{3min}$. The minimum index in the second inner cladding region $\Delta_{3min}$ is preferably less than or equal to −0.08% (i.e., $\Delta_4-\Delta_3 \geq 0.08\%$). In some embodiments, $\Delta_{3min}$ less than or equal to −0.2%. In some embodiments, $\Delta_{3min}$ less than or equal to −0.35%. $R_4$ is the outer radial location of the optical fiber and is in the preferred range of 50 microns $\leq r_4 \leq$ 75 microns, more preferably $r_4$ is 62.5 microns.

The volume $V_{3a3}$ of the second inner cladding region 3 (i.e., the volume of the trench), is defined as shown in equation 7, and given in units of percent delta micron² (%Δ microns²)

$$V_{3a3} = 2\int_{r2}^{r3} \Delta_{(4-3)}(r)r\,dr \quad \text{(Eq. 7)}$$

where $\Delta_{(4-3)}$ is the index difference of $(\Delta_4-\Delta_3)$. In the embodiments of FIGS. 1-5 the absolute volume $V_{3a3}$ of the inner cladding region 3 is 5 Δ % microns² $\leq V_{3a3} \leq$ 105 Δ % microns². In some embodiments, more preferably 5 Δ % microns² $\leq V_{3a3} \leq$ 75 Δ % microns². The inner cladding region 3 preferably exhibits a width $W_3$, $(r_3-r_2)$, between about 5 to 20 microns, more preferably 5 to 15 microns. The ratio of the radius $r_3$ over the inner cladding region 2 radius $r_2$ is preferably greater than 1.3, more preferably between 1.5 and about 4. The moat volume ratio, $V_{3a3ratio}$, is defined in equation 8 as follows, and given in units of percent delta micron² (%Δ microns²)

$$V_{3a3ratio}=V_{3a3}/[\Delta_{3min}(r_3^2-r_2^2)] \quad \text{(Eq. 8)}$$

Preferably the optical fibers herein have a moat volume ratio of $0.3 \leq V_{3a3ratio} \leq 0.8$.

Outer cladding region 4 surrounds the depressed annular region 3 and comprises relative refractive index delta percent $\Delta_4$ which is higher than the index $\Delta_{3min}$ of inner cladding region 3. In some embodiments outer cladding region 4 has relative refractive index greater than that of first inner cladding region 2, thereby forming a region which is an "updoped" outer cladding region 4 with respect to first inner cladding region 2, e.g. by adding an amount of dopant (such as germania or chlorine) sufficient to increase the relative refractive index of the outer cladding region 4. Note, however, that it is not critical that the outer cladding region 4 be updoped in the sense that an index increasing dopant must be included in the outer cladding region 4. Indeed, the raised index effect in outer cladding region 4 may be achieved by downdoping first inner cladding region 2 with respect to outer cladding region 4. According to some embodiments outer cladding region 4 comprises a higher relative refractive index than first inner cladding region 2, and may comprises relative refractive index delta percent $\Delta_4$ which is greater than 0.01%, and in some embodiments be greater than 0.02% or 0.03%, relative to refractive index in the first inner cladding region 2. Preferably, the higher index portion of outer cladding region 4 (compared to first inner cladding region 2 (or to $\Delta_{3max}$) extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. Consequently, the volume $V_4$ of the third annular region 4, is defined herein being calculated between radius $r_3$ and $r_{30}$ (the radius at 30 microns) and thus is defined in equation 9 as $$V_4 = 2\int_{r3}^{r30} \Delta_{(4-2)}(r)r\,dr \quad \text{(Eq. 9)}$$

where $\Delta_{(4-2)}$ is the index difference of $(\Delta_4-\Delta_2)$.

The volume $V_4$ of the outer cladding region 4 (inside 30 microns) compared to that of the first inner cladding region 2, is preferably greater than 5 Δ % microns², more preferably greater than 7 Δ % microns², and may be greater than 10% Δmicrons². This volume $V_4$ of the outer cladding region (inside 30 microns) is in some embodiments less than 50% Δmicrons².

In some embodiments, the relative refractive index $\Delta_4$ of the outer cladding region 4 is greater than first inner cladding index $\Delta_2$ by 0.01%, more preferably greater than 0.02%. In some embodiments, the outer cladding region 4 comprises chlorine (Cl). In some embodiments the outer cladding region includes Germania.

The core region 1 preferably has a positive relative refractive index throughout, and a maximum relative refractive index $\Delta_{1MAX}$ occurs between r=0 and r=3 microns. $\Delta_{1MAX}$ is preferably between 0.30 to 0.48%, and even more preferably between 0.3 to 0.45%.

The first inner cladding region 2 preferably has a substantially constant relative refractive index profile, i.e. the difference between the relative refractive index at any two radii within the intermediate region is less than 0.02%, and in some preferred embodiments less than 0.01%. Thus, the relative refractive index profile of the first inner cladding region 2 preferably has a substantially flat shape. In some embodiments the outer cladding region 4 is updoped relative to pure silica and in some embodiments the first inner cladding region 2 is downdoped relative to pure silica.

The central core region 1 may comprise a alpha (α) shape, where the core alpha, $\alpha_c$, is between 1.5 and 2.5, for example $1.8<\alpha_c<2.2$. In some preferred embodiments, $r_1$ is less than 8.0 microns, and more preferably is between 3.5 microns and 7.0 microns. The fibers are capable of exhibiting mode field diameter at 1310 nm between 8.2 and 9.6 microns, have a zero dispersion wavelength between 1300 and 1324 nm, a cable cutoff less than or equal to 1260 nm, and a bend loss of less than 1 dB/turn when wound upon on a 10 mm radius mandrel.

In some embodiments the graded index central core region 1 comprises Ge doped silica, with Ge levels dropping as the core radius approaches outer radius $r=r_1$. However, in some embodiments the graded index central core comprises fluorine doped silica and is essentially free of germania. In these embodiments the cladding is either downdoped, relative to the central core region with downdopants such as F, B, or may contain non-periodic holes or voids. In some embodiments, the depressed-index annular portion comprises voids, either non-periodically disposed, or periodically disposed, or both.

By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 50 is lowered due to the presence of the voids. While not wishing to be bound by theory, it is believed that the voids extend less than a few meters, and in many cases less than 1 meter along the length of the fiber. Optical fibers disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

In some exemplary embodiments the graded index core region 1 also includes at least one alkali metal oxide dopant, for example, where in the alkali is K (potassium), Na (sodium), Li (lithium), Cs (cesium), and, Rb (rubidium). In some exemplary embodiments the core 1 contains $K_2O$ in the amounts of 20 ppm to 1000 ppm by weight % of K, more preferably between 50-500 ppm wt % of K, and most preferably between 50-300 ppm wt % of K. The fiber may also include chlorine. It is preferable that the amount of chlorine is less than 1500 ppm by wt % in the core region 1, and less than 500 ppm by wt % in the cladding regions 2-4. In some embodiments, the alkali doped fiber comprises a core and/or cladding that is germania free silica (preferably less than 1% germania by weight, more preferably less than 0.1% germania by weight). It is noted that the term "ppm", unless otherwise specially noted otherwise, refers to parts per million by weight, or ppm by weight, and a measurement in wt % can be converted to ppm by multiplying by a factor of 10,000.

The fibers disclosed herein may be drawn from optical fiber preforms made using conventional manufacturing techniques and using known fiber draw methods and apparatus, for example as is disclosed in U.S. Pat. No. 7,565,820, the specification of which is hereby incorporated by reference.

Various exemplary embodiments will be further clarified by the following examples. It will be apparent to those skilled in the art that various modifications and variations can be made without departing from the spirit or scope of the claims.

Fiber Examples 1-25 and Comparative Example

Tables 1-4 below list characteristics of modeled illustrative fiber examples 1-25 and comparative example. In particular, set forth below for each example of Tables 1-4 is the relative refractive index delta $\Delta_1$, alpha$_{core}$, and outer radius $r_1$ of the central core region 1, relative refractive index delta $\Delta_2$ and outer radius $r_2$ first inner cladding region 2, $r_1/r_2$, relative refractive index delta $\Delta_3$ and $\Delta_{3min}$, moat alpha (alpha$_t$), radial locations $r_{3a}$ and $r_3$, $(r_{3a}-r_2)/(r_3-r_2)$, moat volume $V_{3a3}$ and moat volume ratio $V_{3a3ratio}$ of the second inner cladding region 3, relative refractive index delta $\Delta_4$ and volume $V_4$ of the outer cladding region 4, which is calculated between inner radius $r_3$ of outer cladding region 3 and a radial distance of 30 microns. Also set forth (Tables 1-4) are modeled data including: LP11 cutoff wavelength in nm, chromatic dispersion and dispersion slope at 1310 nm, chromatic dispersion and dispersion slope at 1550 nm, mode field diameter at 1310 nm and 1550 nm, pin array macrobend at 1550 nm, LLWM microbend at 1550 nm in dB/m), zero dispersion wavelength (lambda0), 22 m cable cutoff, 1×10 mm, 1×20 mm and 1×30 mm diameter induced bend loss in dB per turn at 1550 nm, MACCab (MFD in microns at 1310 nm/Cable Cutoff in microns).

TABLE 1

| Parameter | Ex-1 | Ex-2 | Ex-3 | Ex-4 | Ex-5 | Ex-6 | Ex-7 | Ex-8 |
| --- | --- | --- | --- | --- | --- | --- | --- | --- |
| R1 (microns) | 5.0 | 5.0 | 6.0 | 6.0 | 5.0 | 5.0 | 6.0 | 6.0 |
| $\Delta1_{max}$ (%) | 0.38 | 0.38 | 0.38 | 0.38 | 0.40 | 0.40 | 0.40 | 0.40 |
| core alpha | 2 | 2 | 2 | 2 | 2 | 2 | 2 | 2 |
| R2 (microns) | 5.0 | 6.0 | 6.0 | 7.0 | 5.0 | 6.0 | 6.0 | 7.0 |
| $\Delta2$ (%) | 0.00 | 0.00 | 0.00 | 0.00 | 0.00 | 0.00 | 0.00 | 0.00 |
| R1/R2 | 1.00 | 0.83 | 1.00 | 0.86 | 1.00 | 0.83 | 1.00 | 0.86 |
| R3a (microns) | 17.0 | 17.0 | 17.0 | 17.0 | 17.0 | 17.0 | 17.0 | 17.0 |
| $\Delta3_{min}$ (%) | −0.45 | −0.45 | −0.45 | −0.45 | −0.45 | −0.45 | −0.45 | −0.45 |
| moat alpha (alpha$_t$) | 1 | 1 | 1 | 1 | 1 | 1 | 1 | 1 |
| R3 (microns) | 17.0 | 17.0 | 17.0 | 17.0 | 17.0 | 17.0 | 17.0 | 17.0 |
| $\Delta3a$ (%) | −0.45 | −0.45 | −0.45 | −0.45 | −0.45 | −0.45 | −0.45 | −0.45 |
| (R3a-R2)/(R3-R2) | 1.00 | 1.00 | 1.00 | 1.00 | 1.00 | 1.00 | 1.00 | 1.00 |
| Moat Volume, $V_{3a3}$ (% Δ microns$^2$) | 70 | 66 | 66 | 61 | 70 | 66 | 66 | 61 |
| Moat Volume Ratio | 0.59 | 0.58 | 0.58 | 0.56 | 0.59 | 0.58 | 0.58 | 0.56 |
| R4 (microns) | 62.5 | 62.5 | 62.5 | 62.5 | 62.5 | 62.5 | 62.5 | 62.5 |
| $\Delta4$ (%) | 0.00 | 0.00 | 0.00 | 0.00 | 0.00 | 0.00 | 0.00 | 0.00 |
| V4 (% Δ microns$^2$) | 0.0 | 0.0 | 0.0 | 0.0 | 0.0 | 0.0 | 0.0 | 0.0 |
| MFD at 1310 nm (microns) | 8.70 | 8.86 | 9.23 | 9.33 | 8.57 | 8.71 | 9.09 | 9.19 |

TABLE 1-continued

| Parameter | Ex-1 | Ex-2 | Ex-3 | Ex-4 | Ex-5 | Ex-6 | Ex-7 | Ex-8 |
|---|---|---|---|---|---|---|---|---|
| MFD at 1550 nm (microns) | 9.85 | 10.07 | 10.28 | 10.45 | 9.69 | 9.89 | 10.13 | 10.27 |
| LP11 Cutoff (nm) | 1033 | 1042 | 1219 | 1238 | 1052 | 1069 | 1252 | 1271 |
| Dispersion at 1310 nm (ps/nm/km) | −0.41 | −0.85 | 1.01 | 0.65 | −0.50 | −0.96 | 0.95 | 0.60 |
| Slope at 1310 nm (ps/nm2/km) | 0.092 | 0.092 | 0.093 | 0.093 | 0.092 | 0.092 | 0.093 | 0.093 |
| Dispersion at 1550 nm (ps/nm/km) | 17.5 | 17.5 | 19.3 | 18.9 | 17.6 | 17.3 | 19.2 | 18.9 |
| Slope at 1550 nm (ps/nm2/km) | 0.064 | 0.065 | 0.064 | 0.064 | 0.064 | 0.065 | 0.064 | 0.064 |
| Cable Cutoff (nm) | 1167 | 1150 | 1371 | 1357 | 1190 | 1179 | 1405 | 1391 |
| MACCab (MFD in microns at 1310 nm/Cable Cutoff in microns) | 7.46 | 7.71 | 6.73 | 6.88 | 7.20 | 7.39 | 6.47 | 6.61 |
| 10 mm diameter Bend (dB/turn) | 0.372 | 0.499 | 0.087 | 0.126 | 0.198 | 0.271 | 0.054 | 0.078 |
| 20 mm diameter Bend (dB/turn) | 0.130 | 0.172 | 0.021 | 0.030 | 0.061 | 0.082 | 0.012 | 0.017 |
| 30 mm diameter Bend (dB/turn) | 0.016 | 0.0192 | 0.0015 | 0.0018 | 0.0067 | 0.0079 | 0.0007 | 0.0009 |
| Lambda0 (nm) | 1314 | 1319 | 1299 | 1303 | 1315 | 1320 | 1300 | 1304 |
| LLWM (dB/m at 1550 nm) | 0.605 | 0.64 | 0.2794 | 0.308 | 0.424 | 0.45 | 0.174 | 0.192 |
| Pin Array (dB at 1550 nm) | 28.10 | 26.60 | 6.34 | 6.29 | 18.32 | 17.48 | 3.60 | 3.58 |

TABLE 2

| Parameter | Ex-9 | Ex-10 | Ex-11 | Ex-12 | Ex-13 | Ex-14 | Ex-15 | Ex-16 |
|---|---|---|---|---|---|---|---|---|
| R1 (microns) | 5.4 | 5.4 | 5.4 | 5.4 | 6.08 | 5.68 | 5.68 | 5.68 |
| $\Delta 1_{max}$ (%) | 0.40 | 0.40 | 0.42 | 0.42 | 0.40 | 0.40 | 0.40 | 0.40 |
| core alpha | 2 | 2 | 2 | 2 | 2 | 2 | 2 | 2 |
| R2 (microns) | 5.4 | 6.6 | 5.4 | 6.6 | 9.12 | 8.52 | 8.52 | 5.68 |
| $\Delta 2$ (%) | 0.00 | 0.00 | 0.00 | 0.00 | 0.00 | 0.00 | 0.00 | 0.00 |
| R1/R2 | 1.00 | 0.82 | 1.00 | 0.82 | 0.67 | 0.67 | 0.67 | 1.00 |
| R3a (microns) | 16.8 | 16.8 | 16.8 | 16.8 | 15.26 | 14.2 | 15.27 | 14.27 |
| $\Delta 3_{min}$ (%) | −0.45 | −0.45 | −0.43 | −0.43 | −0.20 | −0.20 | −0.10 | −0.10 |
| moat alpha ($alpha_t$) | 1 | 1 | 1 | 1 | 1 | 1 | 1 | 1 |
| R3 (microns) | 16.8 | 16.8 | 16.8 | 16.8 | 15.26 | 14.20 | 15.27 | 14.27 |
| $\Delta 3a$ (%) | −0.45 | −0.45 | −0.43 | −0.43 | −0.20 | −0.20 | −0.10 | −0.10 |
| (R3a-R2)/(R3-R2) | 1.00 | 1.00 | 1.00 | 1.00 | 1.00 | 1.00 | 1.00 | 1.00 |
| Moat Volume, $V_{3a3}$ (% $\Delta$ microns$^2$) | 66 | 62 | 72 | 68 | 16.2 | 14.1 | 7.1 | 9.7 |
| Moat Volume Ratio | 0.58 | 0.57 | 0.63 | 0.63 | 0.54 | 0.55 | 0.44 | 0.57 |
| R4 (microns) | 62.5 | 62.5 | 62.5 | 62.5 | 62.5 | 62.5 | 62.5 | 62.5 |
| $\Delta 4$ (%) | 0.00 | 0.00 | 0.02 | 0.02 | 0.00 | 0.00 | 0.00 | 0.00 |
| V4 (% $\Delta$ microns$^2$) | 0.0 | 0.0 | 12.4 | 12.4 | 0.0 | 0.0 | 0.0 | 0.0 |
| MFD at 1310 nm (microns) | 8.82 | 8.96 | 8.74 | 8.85 | 9.29 | 9.10 | 9.11 | 9.04 |
| MFD at 1550 nm (microns) | 9.90 | 10.13 | 9.79 | 9.97 | 10.49 | 10.34 | 10.39 | 10.25 |
| LP11 Cutoff (nm) | 1123 | 1146 | 1078 | 1093 | 1339 | 1252 | 1265 | 1240 |
| Dispersion at 1310 nm (ps/nm/km) | 0.18 | −0.29 | 0.34 | −0.10 | 0.06 | −0.05 | −0.69 | −0.32 |
| Slope at 1310 nm (ps/nm2/km) | 0.092 | 0.0925 | 0.035 | 0.036 | −0.019 | 0.071 | 0.083 | 0.081 |
| Dispersion at 1550 nm (ps/nm/km) | 18.4 | 18.0 | 18.4 | 18.1 | 17.9 | 17.3 | 16.9 | 17.3 |
| Slope at 1550 nm (ps/nm2/km) | 0.0640 | 0.0647 | 0.063 | 0.063 | 0.062 | 0.063 | 0.061 | 0.061 |
| Cable Cutoff (nm) | 1274 | 1261 | 1229 | 1217 | 1289 | 1192 | 1173 | 1180 |
| MACCab (MFD in microns at 1310 nm/Cable Cutoff in microns) | 6.92 | 7.10 | 7.11 | 7.27 | 7.21 | 7.63 | 7.77 | 7.66 |
| 10 mm diameter Bend (dB/turn) | 0.12 | 0.17 | 0.07 | 0.09 | 1.65 | 3.23 | 5.42 | 4.47 |
| 20 mm diameter Bend (dB/turn) | 0.032 | 0.044 | 0.017 | 0.023 | 0.31 | 0.67 | 1.11 | 0.92 |
| 30 mm diameter Bend (dB/turn) | 0.002 | 0.003 | 0.002 | 0.002 | 0.003 | 0.008 | 0.010 | 0.009 |
| Lambda0 (nm) | 1308 | 1313 | 1301 | 1313 | 1313 | 1317 | 1318 | 1314 |

TABLE 2-continued

| Parameter | Ex-9 | Ex-10 | Ex-11 | Ex-12 | Ex-13 | Ex-14 | Ex-15 | Ex-16 |
|---|---|---|---|---|---|---|---|---|
| LLWM (dB/m at 1550 nm) | 0.309 | 0.338 | 0.122 | 0.148 | 0.231 | 0.211 | 0.224 | 0.193 |
| Pin Array (dB at 1550 nm) | 10.14 | 9.75 | 16.77 | 16.39 | 4.38 | 8.34 | 9.16 | 9.2 |

TABLE 3

| Parameter | Ex-17 | Ex-18 | Ex-19 | Ex-20 | Ex-21 | Ex-22 | Ex-23 | Ex-24 | Ex-25 |
|---|---|---|---|---|---|---|---|---|---|
| R1 (microns) | 5.4 | 5.6 | 5.6 | 5.6 | 5.2 | 5.68 | 5.68 | 6.16 | 6.56 |
| $\Delta 1_{max}$ (%) | 0.40 | 0.40 | 0.40 | 0.40 | 0.40 | 0.40 | 0.40 | 0.42 | 0.44 |
| core alpha | 2 | 2 | 2 | 2 | 3 | 2 | 2 | 1.5 | 1 |
| R2 (microns) | 5.4 | 7.0 | 7.0 | 7.0 | 6.5 | 8.52 | 8.52 | 6.16 | 6.6 |
| $\Delta 2$ (%) | 0.00 | 0.00 | 0.00 | 0.00 | 0.00 | 0.00 | 0.00 | 0.00 | 0.00 |
| R1/R2 | 1.00 | 0.80 | 0.80 | 0.80 | 0.80 | 0.67 | 0.67 | 1.00 | 1.00 |
| R3a (microns) | 16.8 | 17.4 | 17.4 | 17.4 | 17.4 | 14.20 | 14.20 | 15.46 | 16.47 |
| $\Delta 3_{min}$ (%) | −0.45 | −0.20 | −0.10 | −0.10 | −0.10 | −0.20 | −0.10 | −0.20 | −0.20 |
| moat alpha ($alpha_t$) | 0.5 | 2 | 2 | 5 | 2 | 1 | 1 | 1 | 1 |
| R3 (microns) | 16.8 | 17.4 | 17.4 | 17.4 | 17.4 | 15.62 | 18.46 | 15.46 | 16.47 |
| $\Delta 3a$ (%) | −0.45 | −0.20 | −0.10 | −0.10 | −0.10 | −0.20 | −0.10 | −0.20 | −0.20 |
| (R3a-R2)/(R3-R2) | 1.00 | 1.00 | 1.00 | 1.00 | 1.00 | 0.80 | 0.57 | 1.00 | 1.00 |
| Moat Volume, $V_{3a3}$ (% $\Delta$ microns$^2$) | 46 | 37.3 | 18.6 | 22.3 | 16.1 | 22.2 | 20.8 | 22.9 | 26.0 |
| Moat Volume Ratio | 0.40 | 0.73 | 0.73 | 0.88 | 0.62 | 0.65 | 0.78 | 0.57 | 0.57 |
| R4 (microns) | 62.5 | 62.5 | 62.5 | 62.5 | 62.5 | 62.5 | 62.5 | 62.5 | 62.5 |
| $\Delta 4$ (%) | 0.00 | 0.00 | 0.00 | 0.00 | 0.00 | 0.00 | 0.00 | 0.00 | 0.00 |
| V4 (% $\Delta$ microns$^2$) | 0.0 | 0.0 | 0.0 | 0.0 | 0.0 | 0.0 | 0.0 | 0.0 | 0.0 |
| MFD at 1310 nm (microns) | 8.84 | 9.00 | 9.04 | 9.00 | 8.79 | 9.09 | 9.11 | 9.15 | 9.15 |
| MFD at 1550 nm (microns) | 10 | 10.17 | 10.29 | 10.2 | 9.92 | 10.36 | 10.36 | 10.33 | 10.43 |
| LP11 Cutoff (nm) | 1162 | 1216 | 1231 | 1218 | 1264 | 1268 | 1260 | 1245 | 1239 |
| Dispersion at 1310 nm (ps/nm/km) | −0.35 | −0.23 | −0.59 | −0.31 | −0.04 | −0.50 | −0.67 | −0.15 | −1.02 |
| Slope at 1310 nm (ps/nm2/km) | 0.067 | 0.025 | 0.076 | 0.065 | 0.067 | 0.072 | 0.076 | 0.042 | 0.073 |
| Dispersion at 1550 nm (ps/nm/km) | 17.6 | 17.8 | 17.1 | 17.5 | 17.8 | 17.5 | 17.0 | 18.0 | 17.4 |
| Slope at 1550 nm (ps/nm2/km) | 0.063 | 0.063 | 0.062 | 0.062 | 0.061 | 0.063 | 0.062 | 0.063 | 0.065 |
| Cable Cutoff (nm) | 1218 | 1238 | 1186 | 1196 | 1214 | 1231 | 1227 | 1244 | 1246 |
| MACCab (MFD in microns at 1310 nm/Cable Cutoff in microns) | 7.26 | 7.27 | 7.62 | 7.52 | 7.24 | 7.38 | 7.42 | 7.35 | 7.34 |
| 10 mm diameter Bend (dB/turn) | 0.47 | 0.66 | 2.63 | 2.00 | 1.73 | 1.78 | 1.97 | 1.59 | 1.31 |
| 20 mm diameter Bend (dB/turn) | 0.011 | 0.015 | 0.056 | 0.043 | 0.033 | 0.037 | 0.041 | 0.033 | 0.028 |
| 30 mm diameter Bend (dB/turn) | 0.0045 | 0.004 | 0.008 | 0.007 | 0.004 | 0.006 | 0.006 | 0.005 | 0.005 |
| Lambda0 (nm) | 1315 | 1319 | 1318 | 1315 | 1311 | 1317 | 1319 | 1314 | 1324 |

TABLE 3-continued

| Parameter | Ex-17 | Ex-18 | Ex-19 | Ex-20 | Ex-21 | Ex-22 | Ex-23 | Ex-24 | Ex-25 |
|---|---|---|---|---|---|---|---|---|---|
| LLWM (dB/m at 1550 nm) | 0.153 | 0.185 | 0.209 | 0.189 | 0.148 | 0.208 | 0.223 | 0.203 | 0.231 |
| Pin Array (dB at 1550 nm) | 9.81 | 7.36 | 9.08 | 8.78 | 4.32 | 6.58 | 7.75 | 7.88 | 8.74 |

TABLE 4

| Parameter | Comparative Example |
|---|---|
| R1 (microns) | 4.5 |
| $\Delta 1_{max}$ (%) | 0.34 |
| core alpha | 20.0 |
| R2 (microns) | 4.5 |
| $\Delta 2$ (%) | 0.0 |
| R1/R2 | 1.00 |
| R3a (microns) | not applicable |
| $\Delta 3_{min}$ (%) | not applicable |
| moat alpha (alpha$_t$) | not applicable |
| R3 (microns) | not applicable |
| $\Delta 3$ (%) | not applicable |
| (R3a − R2)/(R3 − R2) | 0.00 |
| Moat Volume, $V_{3a3}$ (% $\Delta$ microns$^2$) | 0.00 |
| Moat Volume Ratio | not applicable |
| R4 (microns) | 62.5 |
| $\Delta 4$ (%) | 0.00 |
| MFD at 1310 nm (microns) | 9.18 |
| MFD at 1550 nm (microns) | 10.40 |
| LP11 Cutoff (nm) | 1327 |
| Dispersion at 1310 nm (ps/nm/km) | 0.17 |
| Slope at 1310 nm (ps/nm$^2$/km) | 0.086 |
| Dispersion at 1550 nm (ps/nm/km) | 17.0 |
| Slope at 1550 nm (ps/nm$^2$/km) | 0.058 |
| Cable Cutoff (nm) | 1177 |
| MACCab (MFD in microns at 1310 nm/Cable Cutoff in microns) | 7.8 |
| 10 mm diameter Bend (dB/turn) | 8.66 |
| 20 mm diameter Bend (dB/turn) | 0.49 |
| 30 mm diameter Bend (dB/turn) | 0.012 |
| Lambda0 (nm) | 1308 |
| LLWM (dB/m at 1550 nm) | 0.549 |
| Pin Array (dB at 1550 nm) | 9.16 |

The exemplary fibers 1-25 of Tables 1-4 have dispersion at 1310 nm of about −1.05 ps/nm/km to about 1 ps/nm/km, LP11 cut-off wavelength between about 1025 nm and 1300 nm, and a bend loss of less than 5.5 dB/turn around a 10 mm diameter mandrel at 1550 nm wavelength. The exemplary embodiments fibers 1-25 have profile designs having a graded index central core region 1 having outer radius $r_1$, having a relative refractive index $\Delta_1$, a maximum relative refractive index $\Delta_{1max}$ and having an alpha profile, alpha$_{core}$, of $0.5 \leq $alpha$_{core} \leq 4$; and an inner cladding region 3 (i.e., the trench) surrounding the graded index central core region and comprising a relative refractive index delta $\Delta_3$ that becomes more negative with increasing radius. The inner cladding region 3 has an inner radius $r_2$, an outer radius $r_3 > 10$ microns, and a minimum relative refractive index $\Delta_{3min}$ such that $\Delta_{1max} > \Delta_{3min}$, $r_3 \geq r_{3a}$, and $0.5 \leq (r_{3a}-r_2)/(r_3-r_2) \leq 1$, where $r_{3a}$ is a distance from fiber centerline where $\Delta_3$ first reaches the value $\Delta_{3min}$. The inner cladding region 3 has an alpha profile, alpha$_s$ such that $0.5 \leq $alpha$_t \leq 5$. The outer cladding region surrounds the inner cladding region and has a relative refractive index $\Delta_4$, and $\Delta_{3min} < \Delta_4$. In these embodiments the absolute difference between $(\Delta_4 - \Delta_{3min})$ is $0.08\% \leq |\Delta_4 - \Delta_{3min}| \leq 0.7\%$ and the absolute difference between $\Delta_{3min}$ and $\Delta_2$ is greater than 0.03%. The absolute value $V_{3a3}$ of the second inner cladding region is 5% $\Delta$microns$^2 \leq V_{3a3} \leq 105\%$ $\Delta$microns$^2$, and the moat volume ratio is $0.3 \leq V_{3a3ratio} \leq 0.8$. The above fibers 1-25 of Tables 1-4 exhibit a 22 m cable cutoff less than or equal to 1400 nm and in many embodiments less than or equal to 1260 nm, a mode field diameter (MFD) at 1310 nm between 8.2 and 9.6 microns and have a zero dispersion wavelength $\lambda$o and 1300 nm$\leq \lambda$o$\leq$1324 nm.

More specifically, preferably, exemplary optical fiber embodiments 10 described herein exhibit a bend loss at 1550 nm, when wound upon on a 15 mm diameter mandrel, of less than 0.5 dB/turn, and in some cases less than 0.25 dB/turn. These fibers also exhibit a bend loss at 1550 nm, when wound upon on a 10 mm diameter mandrel, of less than 1 dB/turn, more preferably less than 0.5 dB/turn, and some fibers most preferably less than 0.2 dB/turn. The fibers exhibit a bend loss at 1550 nm, when wound upon on a 15 mm diameter mandrel, of less than 0.25 dB/turn, and some fibers more preferably less than 0.15 dB/turn. The fibers exhibit a bend loss at 1550 nm, when wound upon on a 20 mm diameter mandrel, of less than 0.1 dB/turn, and some fibers more preferably less than 0.03 dB/turn. Some of the above fibers exhibit a bend loss of less than 0.75 dB/turn when wound upon on a 20 mm radius mandrel and exhibits a MACCab number between 6.4 and 8.5. (Note, MACCab number=MFD in microns at 1310 nm/Cable Cutoff in microns.) These fibers also exhibit a bend loss at 1550 nm, when wound upon on a 30 mm diameter mandrel, of less than 0.01 dB/turn, and some fibers more preferably less than 0.003 dB/turn. Some of these examples employ chlorine in the outer cladding region in an amount greater than 2000 ppm, and in some cases greater than 3000 or even greater than 4000 ppm by weight. In some embodiments the outer cladding region comprises chlorine in an amount greater than 2000 and less than 12000 ppm by weight.

Attenuation (spectral) at 1550 nm is preferably less than 0.21 dB/km, more preferably less than 0.20 dB/km, even more preferably less than 0.197 dB/km. In some preferred embodiments the attenuation (spectral) at 1550 nm is less than or equal to 0.191 dB/km, even more preferably less than or equal to 0.189 dB/km, even more preferably less than or equal to 0.182 dB/km.

Thus, the embodiments of the optical fibers 10 described herein provide outstanding bending performance, and additionally provide cutoff wavelengths suitable for single mode operation at wavelengths greater than about 1260 nm.

In some embodiments, the core region 1 may comprise a relative refractive index profile having a so-called centerline dip which may occur as a result of one or more optical fiber manufacturing techniques. However, the centerline dip in any of the relative refractive index profiles disclosed herein is optional.

The optical fiber 10 disclosed herein comprises a core and a cladding layer (or cladding or outermost annular cladding region) surrounding the core. Preferably, the core is comprised of silica doped with germanium, i.e. germania doped silica. Dopants other than germanium, singly or in combination, may be employed within the core, and particularly at or near the centerline, of the optical fiber disclosed herein to obtain the desired relative refractive index and density.

Preferably, the optical fiber disclosed herein has a silica-based core region 1 and cladding. In preferred embodiments, the cladding has an outer diameter, 2 times $r_4$, of about 125 micron.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. A single mode optical fiber comprising:
   a graded index central core region having outer radius $r_1$, having a relative refractive index $\Delta_1$, a maximum relative refractive index $\Delta_{1max}$ and having an alpha profile, alpha$_{core}$, of $0.5 \leq$ alpha$_{core} \leq 4$;
   a cladding region including
   (a) a trench region surrounding said graded index central core region and comprising a relative refractive index delta $\Delta_3$ profile that becomes more negative with increasing radius, said trench region having an inner radius $r_2$, an outer radius $r_3 > 10$ microns, and a minimum relative refractive index $\Delta_{3min}$ such that $\Delta_{1max} > \Delta_{3min}$, $r_3 \geq r_{3a}$, and $0.5 \leq (r_{3a}-r_2)/(r_3-r_2) \leq 1$, where $r_{3a}$ is a distance from fiber centerline where $\Delta_3$ first reaches the value $\Delta_{3min}$, said trench region having an alpha profile, alpha$_t$ such that $0.5 \leq$ alpha$_t \leq 5$, and
   (b) an outer cladding region surrounding said trench region and having a relative refractive index $\Delta_4$, and $\Delta_{3min} < \Delta_4$,
   and wherein $0.08\% \leq |\Delta_4 - \Delta_{3min}| \leq 0.7\%$ and the absolute difference between $\Delta_{3min}$ and $\Delta_2$ is greater than 0.03, the absolute value $V_{3a3}$ of the trench region is 5% $\Delta$microns$^2 \leq V_{3a3} \leq 105\%$ $\Delta$microns$^2$, and said fiber exhibits a 22 m cable cutoff less than or equal to 1400 nm.

2. A single mode optical fiber comprising:
   a graded index central core region having outer radius $r_1$, having a relative refractive index $\Delta_1$, a maximum relative refractive index $\Delta_{1max}$ and having an alpha profile alpha$_{core}$, of $0.5 \leq$ alpha$_{core} \leq 4$;
   a cladding region including
   (a) a trench region surrounding said graded index central core region and comprising a relative refractive index delta $\Delta_3$ profile that becomes more negative with increasing radius, said trench region having an inner radius $r_2$, an outer radius $r_3 > 10$ microns, and a minimum relative refractive index $\Delta_{3min}$ such that $\Delta_{1max} > \Delta_{3min}$, $r_3 \geq r_{3a}$, and $0.5 \leq (r_{3a}-r_2)/(r_3-r_2) \leq 1$, where $r_{3a}$ is a distance from fiber centerline where $\Delta_3$ first reaches the value $\Delta_{3min}$, said trench region having an alpha profile, alpha$_t$ such that $0.5 \leq$ alpha$_t \leq 5$, and
   (b) an outer cladding region surrounding said trench region and having a relative refractive index $\Delta_4$, and $\Delta_{3min} < \Delta_4$, wherein the cladding region further comprises a first inner cladding region that has a relative refractive index delta $\Delta_2$ and is situated between said central core region and said trench region, such that the outer radius of said first inner cladding region equals to the inner radius $r_2$ of said trench region, and $r_2 \leq 10$ microns, and $0.65 \leq r_1/r_2 < 1$, said first inner cladding region having a relative refractive index $\Delta_2$; and $\Delta_{1max} > \Delta_2 > \Delta_{3min}$,
   and $0.08\% \leq |\Delta_4 - \Delta_{3min}| \leq 0.7\%$, the absolute difference between $\Delta_3 \Delta_2$ is greater than 0.03, the absolute value $V_{3a3}$ of the trench region is 5% $\Delta$microns$^2 \leq V_{3a3} \leq 105\%$ $\Delta$microns$^2$, and said fiber exhibits a 22 m cable cutoff wavelength of less than or equal to 1400 nm.

3. The optical fiber of claim 1 wherein $0.3\% < \Delta_{1max} < 0.48\%$.

4. The optical fiber of claim 2 wherein $0.08\% \leq |\Delta_4 - \Delta_{3min}| \leq 0.25\%$.

5. The optical fiber of claim 2 wherein $0.25\% \leq |\Delta_4 - \Delta_{3min}| \leq 0.55\%$.

6. The optical fiber of claim 2 wherein the graded index central core region comprises germania doped silica.

7. The optical fiber of claim 2, wherein the graded index central core comprises fluorine doped silica and is essentially free of germania.

8. The optical fiber of claim 7, wherein the graded index central core region comprises potassium.

9. The optical fiber of claim 2, wherein the first inner cladding region is essentially free of fluorine and germania.

10. The optical fiber of claim 2, wherein $\Delta_4 > \Delta_2$ for a radial length extending from $r_3$ to a radius of at least 30 microns.

11. The optical fiber of claim 2, wherein the profile volume, $V_4$ of the outer cladding region, calculated between the outer radius of trench region and a radial distance of 30 microns, is equal to:

$$V_4 = 2\int_{r3}^{r30} \Delta_{(4-2)}(r) r\, dr$$

and $|V_4|$ is at least 5% $\Delta$microns$^2$.

12. The optical fiber of claim 2, wherein said fiber exhibits a bend loss of less than 0.75 dB/turn when wound upon on a 20 mm radius mandrel and exhibits a MACCab number between 6.4 and 8.5.

13. The optical fiber of claim 2, wherein the width of trench region $r_3 - r_2$ is between 3 and 20 microns.

14. The optical fiber of claim 2, wherein said fiber exhibits a bend loss of less than 1 dB/turn when wound upon on a 10 mm diameter mandrel.

15. The optical fiber of claim 2, where $\alpha_t$ is $5 \geq \alpha_t \geq 0.5$.

16. The optical fiber of claim 2 wherein $0.01\% \leq |\Delta_4 - \Delta_2|$.

17. The optical fiber of claim 2 having a moat volume ratio of $0.3 \leq V_{3a3ratio} \leq 0.8$.

18. The optical fiber of claim 2, wherein said trench region has a volume $V_{3a3}$ and 5 $\Delta$ % microns$^2 \leq V_{3a3} \leq 105$ $\Delta$ % microns$^2$.

19. The optical fiber of claim 2 having a 22 m cable cutoff less than or equal to 1260 nm, and has a zero dispersion wavelength $\lambda$o of 1300 nm$\leq \lambda$o$\leq 1324$ nm.

20. A single mode optical fiber comprising:
   a graded index central core region having outer radius $r_1$, having a relative refractive index $\Delta_1$, a maximum refractive index $\Delta_{1max}$ and having an alpha profile, alpha$_{core}$, of $0.5 \leq$ alpha$_{core} \leq 4$;
   a cladding region comprising (i) a first inner cladding region having an outer radius $r_2 \leq 10$ microns and relative refractive index $\Delta_2$ and $0.65 \leq r_1/r_2 \leq 1$; (ii) and a second inner cladding region having an outer radius $r_3 > 10$ microns and comprising a relative refractive index $\Delta_3$ and a minimum relative refractive index $\Delta_{3min}$, wherein said second inner cladding region has a relative refractive index delta that becomes more negative with increasing radius, wherein said second cladding region has an alpha profile, alpha$_r$, of $0.5 \leq$ alpha$_r \leq 5$; and (iii) an outer cladding region surrounding the second inner cladding region and comprising relative refractive index $\Delta_4$, wherein $\Delta_{1max} > \Delta_2 > \Delta_{3min}$, and $\Delta_{3min} < \Delta_4$; and wherein $0.5 \leq (r_{3a} - r_2)/(r_3 - r_2) \leq 1$ where $r_{3a}$ is a distance from fiber centerline where $\Delta_3$ first reaches the value $\Delta_{3min}$, and said fiber exhibits a 22 m cable cutoff wavelength of less than or equal to 1400 nm.

* * * * *